United States Patent
Codilian

(10) Patent No.: US 6,967,804 B1
(45) Date of Patent: Nov. 22, 2005

(54) SHOCK EVENT ERROR LOGGING IN A DISK DRIVE

(75) Inventor: Raffi Codilian, Irvine, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 235 days.

(21) Appl. No.: 10/008,763

(22) Filed: Nov. 30, 2001

(51) Int. Cl.$^7$ ............................................. G11B 21/02
(52) U.S. Cl. ...................................................... 360/75
(58) Field of Search ............................... 360/75, 60, 31

(56) References Cited

U.S. PATENT DOCUMENTS

| | | | |
|---|---|---|---|
| 5,077,736 A * | 12/1991 | Dunphy et al. | 714/7 |
| 5,491,394 A * | 2/1996 | Harwood et al. | 318/563 |
| 5,654,840 A | 8/1997 | Patton et al. | |
| 5,930,068 A * | 7/1999 | Gregg et al. | 360/77.05 |
| 6,018,431 A * | 1/2000 | Carlson et al. | 360/60 |
| 6,115,200 A * | 9/2000 | Allen et al. | 360/60 |
| 6,178,058 B1 | 1/2001 | Pan et al. | |
| 6,188,533 B1 | 2/2001 | Yoshida | |
| 6,226,140 B1 * | 5/2001 | Serrano et al. | 360/60 |
| 6,510,014 B2 * | 1/2003 | Kikuta et al. | 360/60 |

* cited by examiner

Primary Examiner—David Hudspeth
Assistant Examiner—Mitchell Slavitt
(74) Attorney, Agent, or Firm—Knobbe Martens Olson & Bear

(57) ABSTRACT

A disk drive with a shock event logger that records information about a shock event as determined by a shock detection system. The shock detection system analyzes signals that result from movement of part of the disk drive and determines if the movement is due to a shock. Information about the shock event is recorded by the shock event logger to a non-volatile memory. In one embodiment, the shock detection system is a position error signal processor that detects shocks based on deviation of a transducer from its reference position, or based on time elapsed during settling of the deviated transducer. In one embodiment, the shock event logger records information about the shock event sequentially. In another embodiment, the shock event logger records the shock event information in the form of a histogram. Logged shock event information improves the manner in which the disk drive is diagnosed and serviced.

34 Claims, 13 Drawing Sheets

SHOCK EVENT ERROR LOGGING IN A DISK DRIVE

BACKGROUND OF THE INVENTION

1. Field of the Invention

The present invention relates to computer data storage devices and, in particular, relates to a hard disk drive with a shock event logging capability.

2. Description of the Related Art

Hard disk drive storage devices are an important component in virtually all computer systems. In particular, hard disk drives provide computer systems with the ability to store and retrieve data in a non-volatile manner such that the data is maintained even if power is removed from the device. The popularity of these devices is based on their ability to quickly store and retrieve large quantities of digital information at low cost.

The typical hard disk drive comprises one or more pivotally mounted disks having a magnetic recording layer disposed thereon and a plurality of magnetic transducer elements for affecting and sensing the magnetization states of the recording layer. The recording layer comprises a large number of relatively small domains disposed thereon that can be independently magnetized according to a localized applied magnetic field and that can be maintained in the magnetized state when the external field is removed. The domains are grouped into concentric circular tracks each having a unique radius on the disk and data is written to or read from each track by positioning the transducer over the disk at the corresponding radius while the disk is rotated at a fixed angular speed.

To position the transducer with respect to the disk, the typical hard disk drive further comprises a head stack assembly (HSA) that includes a transducer, a pivotally mounted actuator arm for supporting the transducer, a voice coil motor (VCM) for exerting a torque onto the actuator arm, and a servo-controller for controlling the VCM. The VCM comprises a coil of conducting wire wound into a plurality of loops and a permanent magnet disposed adjacent the coil. The servo-controller initiates movement of the actuator arm by directing a control current to flow through the coil which results in the permanent magnet applying a force onto the coil which is then transferred to the actuator arm in the form of a torque. Because the direction of the torque is dictated by the direction of control current flow, the servo-controller is able to reposition the transducer by first directing the control current through the coil so as to angularly accelerate the actuator arm in a first direction and then reversing the control current so as to angularly decelerate the actuator arm.

The rotation of the disk and positioning of the transducer relative to the disk are performed in manners that rely on tight tolerances between parts that move relative to each other at high speeds. Faster rotation of the disk generally facilitates faster data retrieval and writing. Smaller distance between the transducer and the disk surface, and improvements in the transducer performance generally facilitate increase in areal density of data storable on the disk surface. One consequence of increase in areal data density is a closer spacing between adjacent tracks. Thus, as technology permits, the hard disk drives operate at faster speeds in general, and tolerances between moving parts, and between functional features such as tracks, become smaller.

One of the consequences of operating disk drives at small tolerances is that moving parts or features in close proximity are susceptible to unwanted physical contact or intrusion when the disk drive is subjected to a disruptive movement such as a shock. While disk drives are engineered to withstand a certain level of shock, many disk drives are subjected to potentially damaging shocks during operation. This is particularly true with disk drives associated with portable computers, such as laptop computers, that are moved about considerably more than a stationary computer.

When the disk drive receives a shock, the resulting 'damage' may range from a simple missed data retrieval that can be remedied easily during subsequent rotations of the disk, to a physical damage to the disk surface that results in permanent loss of data recorded thereon. Another common damage that can occur due to a shock is that the transducer can be bumped from its assigned track and intrude into neighboring tracks, while a write signal is being applied to the transducer. Such mishap results in unwanted writing of data on the wrong track, thus causing a loss of data on that written-over portion.

A shock may also occur when the transducer is in the process of reading data from the disk. A sudden displacement of the transducer to another track may yield inclusion of wrong data segment in the data output from the disk drive. While such a situation does not damage the data itself on the disk, inadvertent passing of wrong data to the computer may have serious negative effects in many aspects.

To prevent such writing and reading of data on the wrong track, the servo controller receives position error signals (PES) from the relative positioning of the transducer to the servo wedges. If the PES indicates that the transducer is off track, the transducer is brought back in line with the track in a manner well known in the art. As is also known in the art, when the transducer is off track by more than a predetermined amount, a write-unsafe (WUS) condition exists, wherein application of write signal in such a condition can damage the data recorded on the adjacent track. The WUS condition is typically triggered when the transducer deviates from its assigned track by more than 16% of the track width.

In addition to triggering the WUS condition by excessive PES, some disk drives include a shock sensor that senses shocks independently. When the shock sensor is subjected to a shock with a magnitude larger than a predetermined threshold, the shock sensor generates a signal functionally similar to the WUS signal.

Other methods of detecting shocks to the hard disk drive include a back-emf signal processor or similar devices that detect unexpected movements of the transducer. As is known in the art, motion of a coil, such as that of the VCM, with respect to a changing magnetic flux generates a voltage across the leads of the coil so as to oppose the flux change. This effect, known as back-emf, exists in the VCM coil whether a control current is being applied to the VCM or not. Thus, the back-emf signal can be detected so as to determine if the transducer's movement is an unexpected movement due to effects such as a shock.

Shock detection systems, such as those referred to above, typically prevent erroneous writing or reading of data. As such, the function of shock detection systems generally does not provide additional function beyond the prevention of erroneous operations. For example, a disk drive may be damaged as a result of a shock. While the shock detection system might have prevented writing or reading of data during the shock event, other components of the disk drive may have been damaged. When the disk drive is being serviced due to such damage, a service provider may not have knowledge of what might have caused the damage.

From the foregoing, it will be appreciated that there is a need for a shock event logging system in hard disk drives.

In particular, there is a need for a shock event logging system that permits improved diagnosis of shock related damages to the disk drive.

SUMMARY OF THE INVENTION

The aforementioned needs are satisfied by a hard disk drive comprising a rotatable disk having a magnetic recording media wherein the rotatable disk defines a plurality of concentric servo tracks. The hard disk drive further comprises a pivotable actuator that is movable with respect to the rotatable disk, and a transducer disposed on the actuator so as to be positioned with respect to selected ones of the plurality of concentric servo tracks. The hard disk drive further comprises a controller that controls the movement and position of the transducer with respect to the selected servo tracks. The hard disk drive further comprises a shock detection system that analyzes a signal indicative of a movement of at least a portion of the hard disk drive and determines whether the hard disk drive has experienced a shock event. The hard disk drive further comprises a shock event logger that records information about the shock event as determined by the shock detection system.

In one embodiment, the shock event logger records the shock event information to a memory. In one embodiment, the memory is a non-volatile memory. In one embodiment, the non-volatile memory is a semiconductor memory. In another embodiment, the non-volatile memory is a portion of the rotatable disk.

In one embodiment, the shock detection system comprises a shock sensor signal processor that analyzes a signal from a shock sensor. In one embodiment, the shock sensor is preferably an accelerometer that measures linear acceleration. In another embodiment, the shock sensor is an accelerometer that measures rotational acceleration. Alternatively, the shock sensor comprises an accelerometer that measures both linear and rotational accelerations.

In one embodiment, the shock detection system comprises a back-emf signal processor that analyzes a back-emf signal generated when the actuator moves. In another embodiment, the shock detection system comprises a position error signal processor that analyzes the position error signal indicative of a position deviation of the transducer from a reference position. The position error signal processor determines that a shock event has occurred when the position error signal exceeds a predetermined threshold value. In one implementation, the predetermined threshold value is position error signal representing approximately 32% of a track width.

One aspect of the invention relates to the shock event logger that records the position error signal to the non-volatile memory. In one implementation, the shock event logger records position error signals corresponding to a plurality of shock events in a sequential manner. In another implementation, the shock event logger records the number of shock events in an incremental register. In yet another implementation, the shock event logger records a histogram of the position error signal, wherein the histogram represents a plurality of shock events.

Another embodiment of the shock detection system comprises a position error signal processor that monitors an elapsed time taken for the position deviated transducer to return to and maintain a position within a reference window for a predetermined time. The position error signal processor determines that a shock event occurred when the elapsed time exceeds a predetermined duration. The predetermined duration is the time taken for a predetermined number of wedge-to-wedge time intervals encountered by the transducer. The wedge-to-wedge time interval represents a unit of time that depends on the rotational speed of the disk and the number of servo wedges per servo track. In one implementation, the predetermined duration is 100 wedge-to-wedge time intervals. In another implementation, the predetermined duration is 300 wedge-to-wedge time intervals. In yet another implementation, the predetermined duration is 500 wedge-to-wedge time intervals.

One aspect of the invention relates to the shock event logger recording the elapsed time to the non-volatile memory. In one implementation, the shock event logger records elapsed times corresponding to a plurality of shock events in a sequential manner. In another implementation, the shock event logger records the number of shock events in an incremental register. In yet another implementation, the shock event logger records a histogram of the elapsed time, wherein the histogram represents a plurality of shock events.

Another aspect of the invention relates to a method of logging shock events in a hard disk drive comprising a rotatable disk having a magnetic recording media. The method comprises monitoring a signal from a component of the hard disk drive that responds to at least one of displacement, velocity, or acceleration of at least a portion of the hard disk drive. The method further comprises evaluating the signal to determine whether the at least one of displacement, velocity, or acceleration is a result of a shock event, and recording information about the shock event.

Preferably, recording comprises logging of information about the shock event to a non-volatile memory. In one implementation, logging to the non-volatile memory comprises logging to a semiconductor memory. In another implementation, logging to the non-volatile memory comprises logging to a portion of the rotatable disk.

In one implementation, logging of the shock event information is done in a sequential manner. In another implementation, logging of the shock event information comprises incrementing a register to keep track of the number of shock events detected. In yet another implementation, logging of the shock event information comprises recording a histogram of the shock event information, wherein the histogram represents a plurality of shock events.

DETAILED DESCRIPTION OF THE PREFERRED EMBODIMENT

Figure 1A:
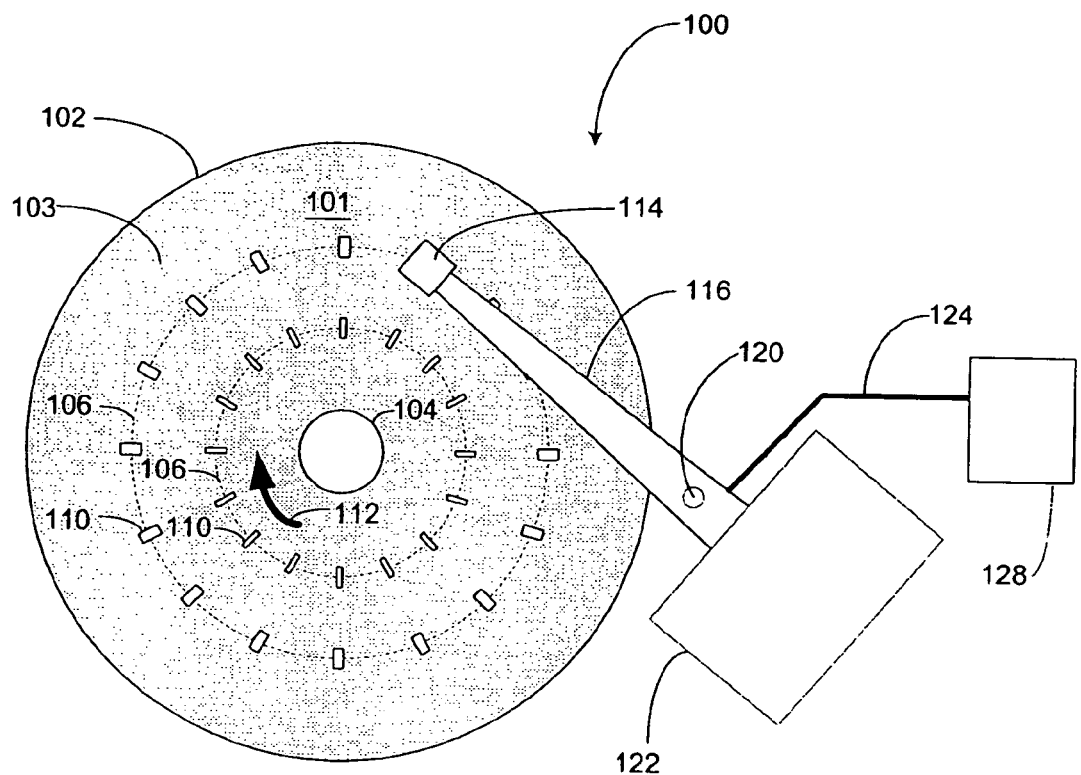
FIG. 1A schematically illustrates a top view of a typical hard disk drive.

Reference will now be made to the drawings wherein like numerals refer to like parts throughout. FIG. 1A schematically illustrates an exemplary hard disk drive 100 for storing information. The hard disk drive 100 includes a plurality of disks 102 that have a magnetic media 101 formed on the surfaces 103 of the disks 102. The magnetic media 101 is programmable such that application of an external magnetic field results in a change of the magnetic state of the media which permits the magnetic media to be selectively magnetized to store data. The disks 102 are preferably organized into a plurality of concentric magnetic domains which include servo tracks 106. A given servo track 106 is defined by a plurality of servo wedges 110 that are arranged so as to be substantially similarly spaced from an axis of a spindle 104 about which the disk 102 rotates. The servo wedges 110 on a given track 106 are spaced circumferentially in a periodic manner and they provide positional information used by the hard disk drive 100 during reading and writing operations in a manner known in the art.

The hard disk drive 100 further comprises a transducer 114 mounted on an actuator 116 that rotates about a pivot 120 due to controlled torques applied by a voice coil motor (VCM) 122. A signal bus 124 interconnects the transducer 114 and the VCM 122 to a controller 128 such that the controller 128 can control the movement of the actuator 116 in a manner well known in the art. Furthermore, the controller 128 sends and receives signals to and from the transducer 114 so as to permit the transducer to read, write, and erase information contained on the disk 102.

In operation, the disk 102 rotates in an exemplary direction 112 about the axis of the spindle 104 at a substantially fixed angular speed such that the surface 103 of the disk 102 moves relative to the transducer 114. The transducer's radial position on the disk 102 is changeable by the rotation of the actuator 116 so as to be able to position the transducer 114 on a desired servo track 106. The transducer's radial and circumferential position on the disk 102 is determined by reading of the information contained in the servo wedges 110 in a manner well known in the art. Once the transducer 114 is positioned on the desired servo track 106, data can be written to or read from a circular arc between the servo wedges 110.

Figure 1B:
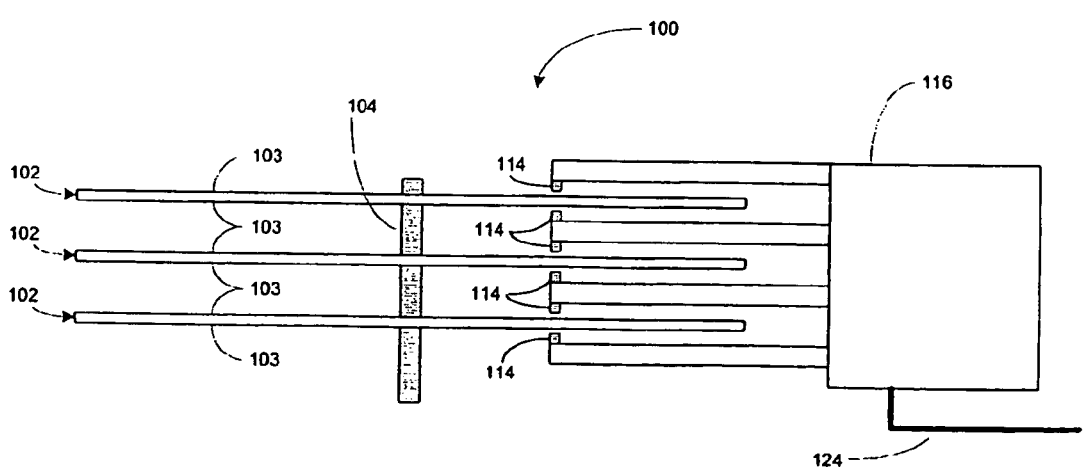
FIG. 1B illustrates a side view of the hard disk drive of FIG. 1A.

FIG. 1B illustrates a side view of the exemplary hard disk drive 100, showing that the hard disk drive 100 may have more than one disk 102 mounted on a common spindle 104. Associated with each disk surface 103 is a transducer 114 mounted to a common actuator 116. Thus, the disks 102 rotate in unison, and the transducers 114 move in unison relative to the rotating disks 102. The transducers 114 are arranged to have substantially same radial distance from the axis of the spindle 104, such that the transducers 114 trace out circles on each disk 102 to form an outline of a cylinder. As such, the servo tracks are frequently referred to as cylinders.

Figure 2:
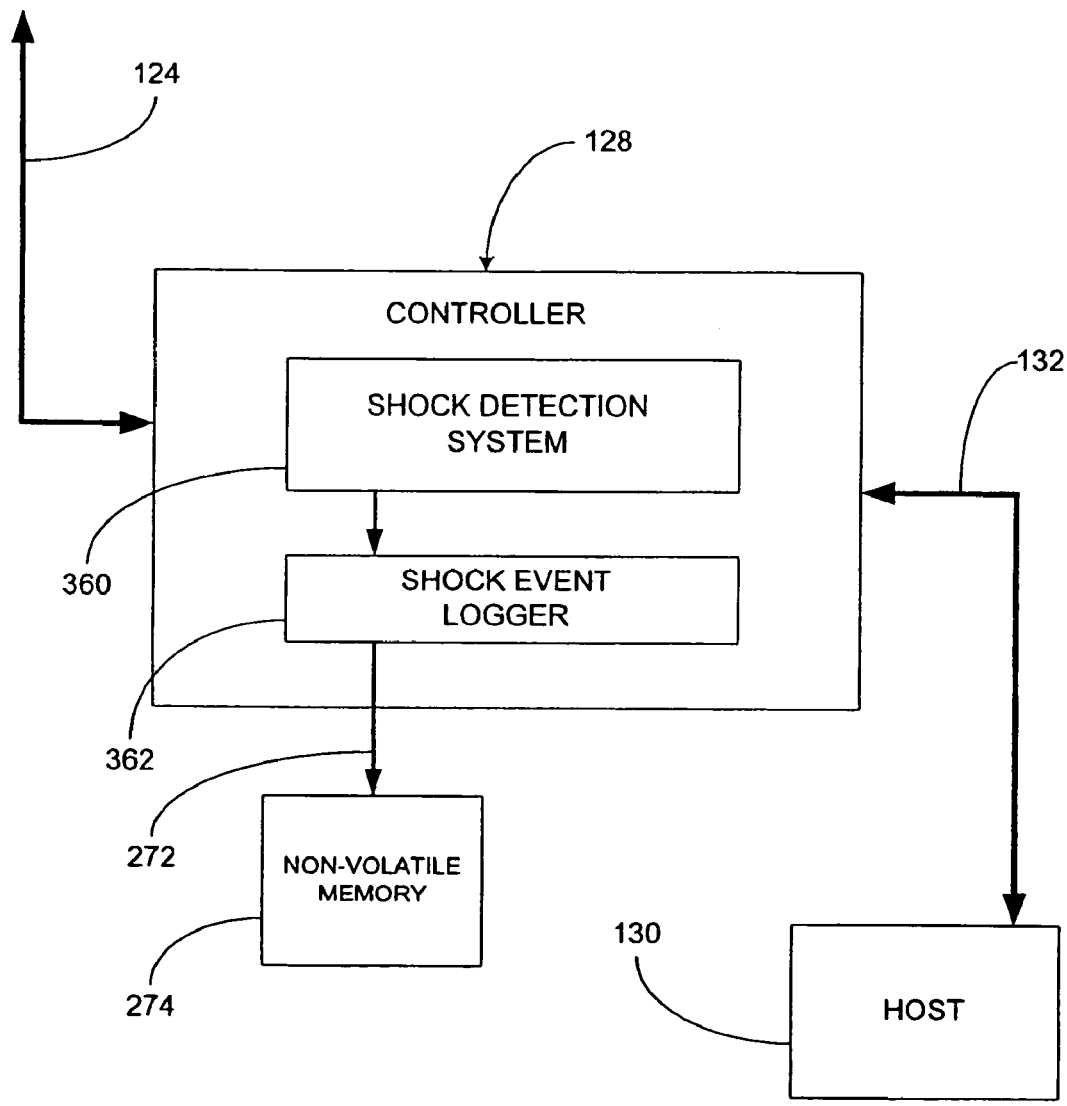
FIG. 2 is a functional block diagram of one embodiment of a controller that interconnects the hard disk drive to a host computer, wherein the controller comprises a shock detection system and a shock event logger.

FIG. 2 illustrates the controller 128 interconnected to a host computer 130 by a bus 132 so as to permit transfer of data between the hard disk drive and the host 130 in a manner well known in the art. The signal bus 124 permits the controller 128 to control the movement of the actuator, and thus the transducer, as well as transferring data between the disk and the controller 128 in a manner well known in the art.

FIG. 2 further illustrates one aspect of the invention, wherein the controller 128 comprises a shock detection system 360 that determines whether the hard disk drive has been subjected to a shock event. Various shock detection systems are described below in greater detail. The controller 128 further comprises a shock event logger 362 that receives information about the shock event from the shock detection system 360 and records selected information 272 to a non-volatile memory 274 in a manner described below.

Figure 3A:
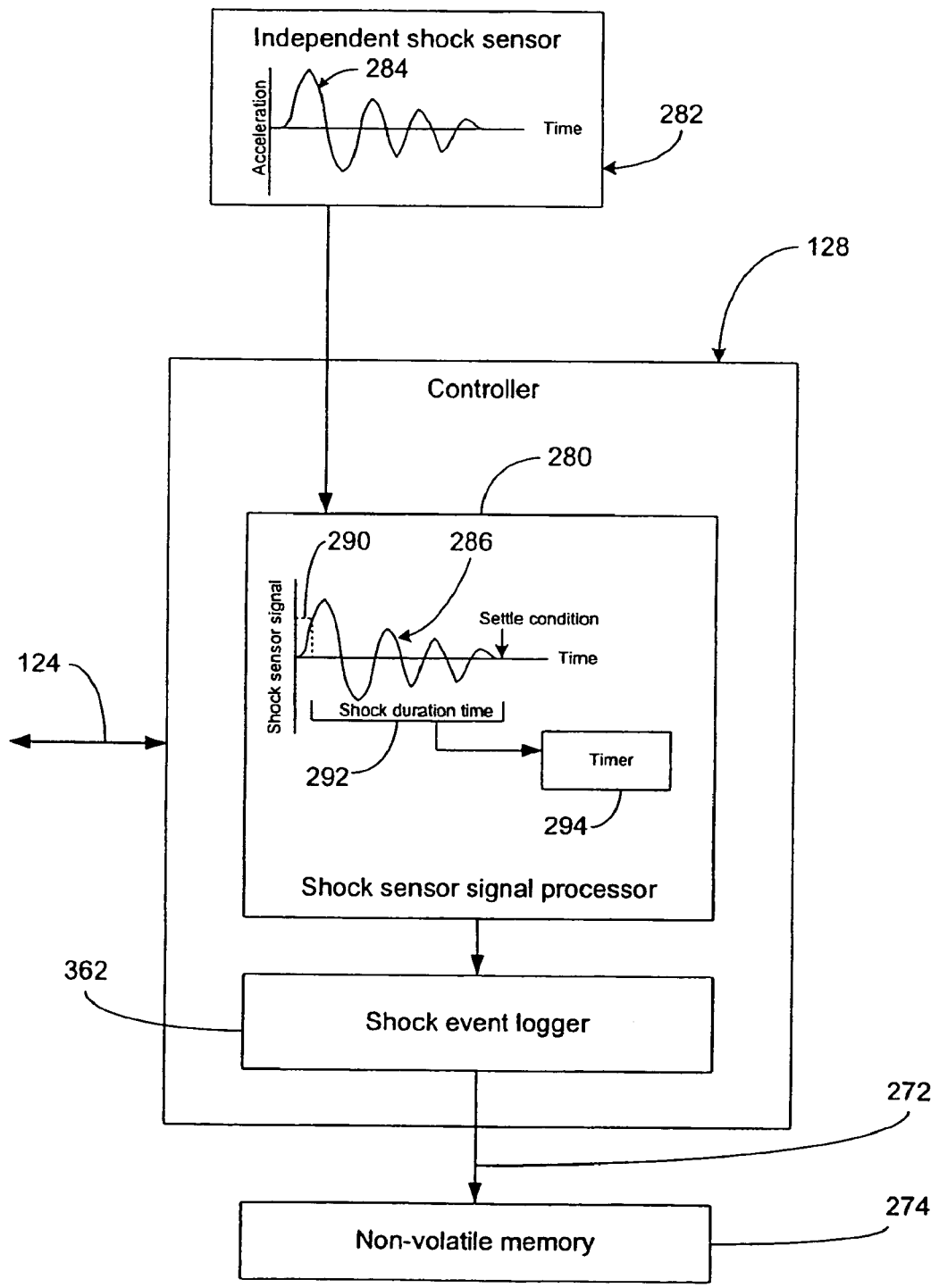
FIG. 3A illustrates a block diagram of one embodiment of the controller wherein the shock detection system comprises a shock sensor and a shock sensor signal processor.

One aspect of the invention relates to logging information about the shock event as determined by the shock detection system. FIGS. 3A–D illustrate some of the possible implementations of the shock detection system. In FIG. 3A, the shock detection system comprises an independent shock sensor 282 such as an accelerometer. The shock sensor 282 measures acceleration 284 experienced by the hard disk drive. The measured acceleration 284 is passed onto a shock sensor signal processor 280 that determines if the acceleration of the hard disk drive is due to a shock.

As shown in FIG. 3A, an exemplary shock sensor signal 286 received from the shock sensor 282, and indicative of the measured acceleration 284, exceeds a predetermined threshold value 290 so as to define a shock event. In one embodiment, a timer 294 is triggered when the shock sensor signal 290 exceeds the predetermined threshold value 290, so as to start a shock duration 292. The shock duration 292 ends when a settle condition is satisfied. The shock duration 292 greater than a specified time interval is indicative of a shock event in one embodiment.

In one embodiment, the predetermined threshold value 290 is set to correspond to an acceleration of approximately 5Gs. The shock sensor signal 286 that exceeds such a threshold can be further analyzed in a manner described below so as to provide the shock event logger 362 with shock event information. The shock event logger 362 then records the selected information 272 to the non-volatile memory 274 in a manner described below.

Figure 3B:
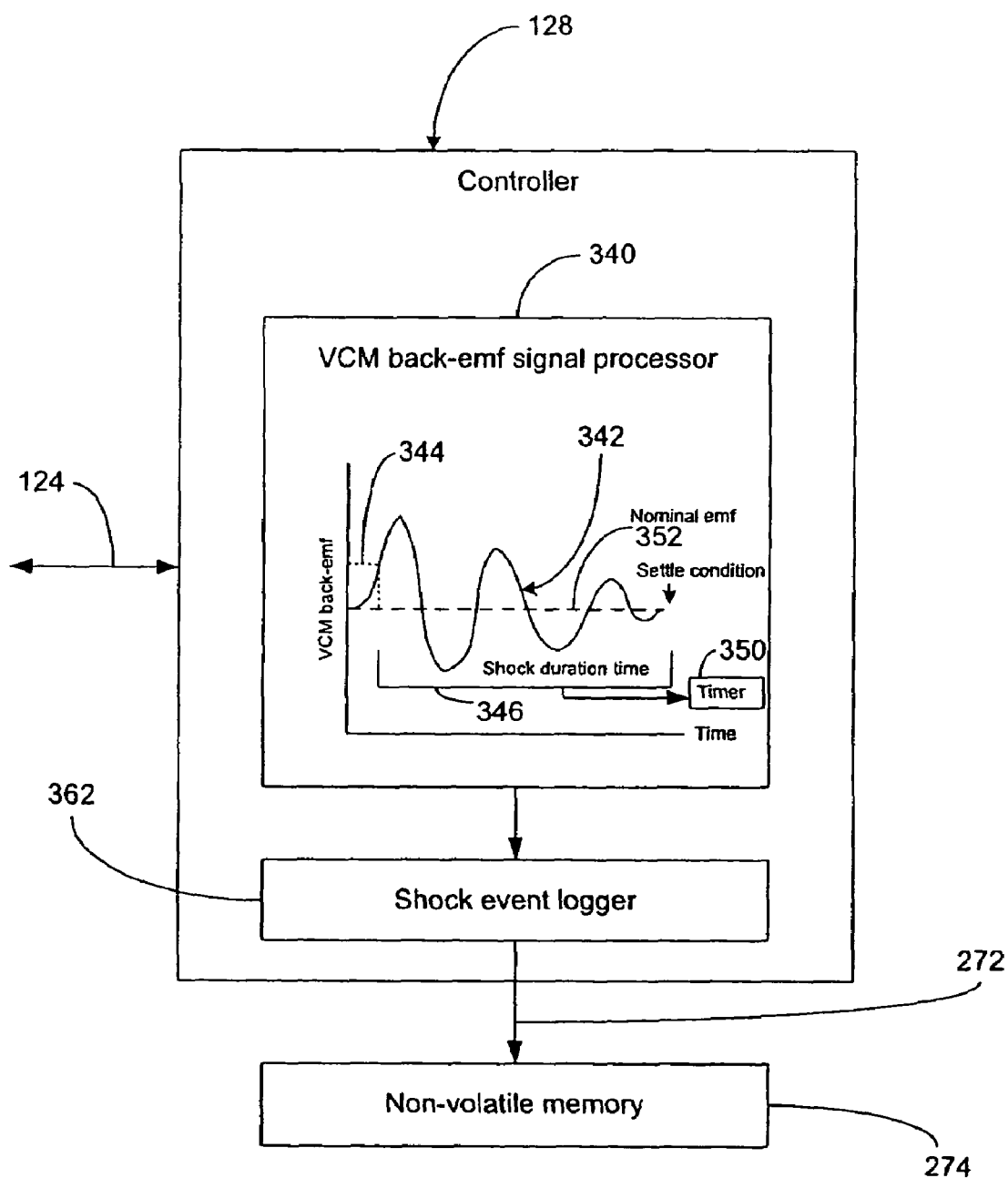
FIG. 3B illustrates a block diagram of one embodiment of the controller wherein the shock detection system comprises a voice coil motor (VCM) back-emf signal processor.

FIG. 3B illustrates the shock detection system that comprises a VCM back-emf signal processor 340. As referred to in the "Description of the Related Art" section, monitoring of the back-emf signal permits determination of unexpected movement of the transducer, such as that caused by a shock. An exemplary VCM back-emf signal 342 is analyzed by the VCM back-emf signal processor 340 to determine if the back-emf signal is due to a shock.

As shown in FIG. 3B, the exemplary back-emf signal 342 exceeds a predetermined threshold value 344 when compared to a nominal back-emf signal curve 352 so as to define a shock event. In one embodiment, a timer 350 is triggered when the back-emf signal 342 exceeds the predetermined threshold value 344, so as to start a shock event duration 346. The shock duration 346 ends when a settle condition is satisfied. The shock duration 346 greater than a specified time interval is indicative of a shock event in one embodiment.

In one embodiment, the VCM back-emf signal processor 340 further processes the back-emf signal 342 within the shock duration time 346 in a manner described below so as to provide the shock event logger 362 with shock event information. The shock event logger 362 then records the selected information 272 to the non-volatile memory 274 in a manner described below.

Figure 3C:
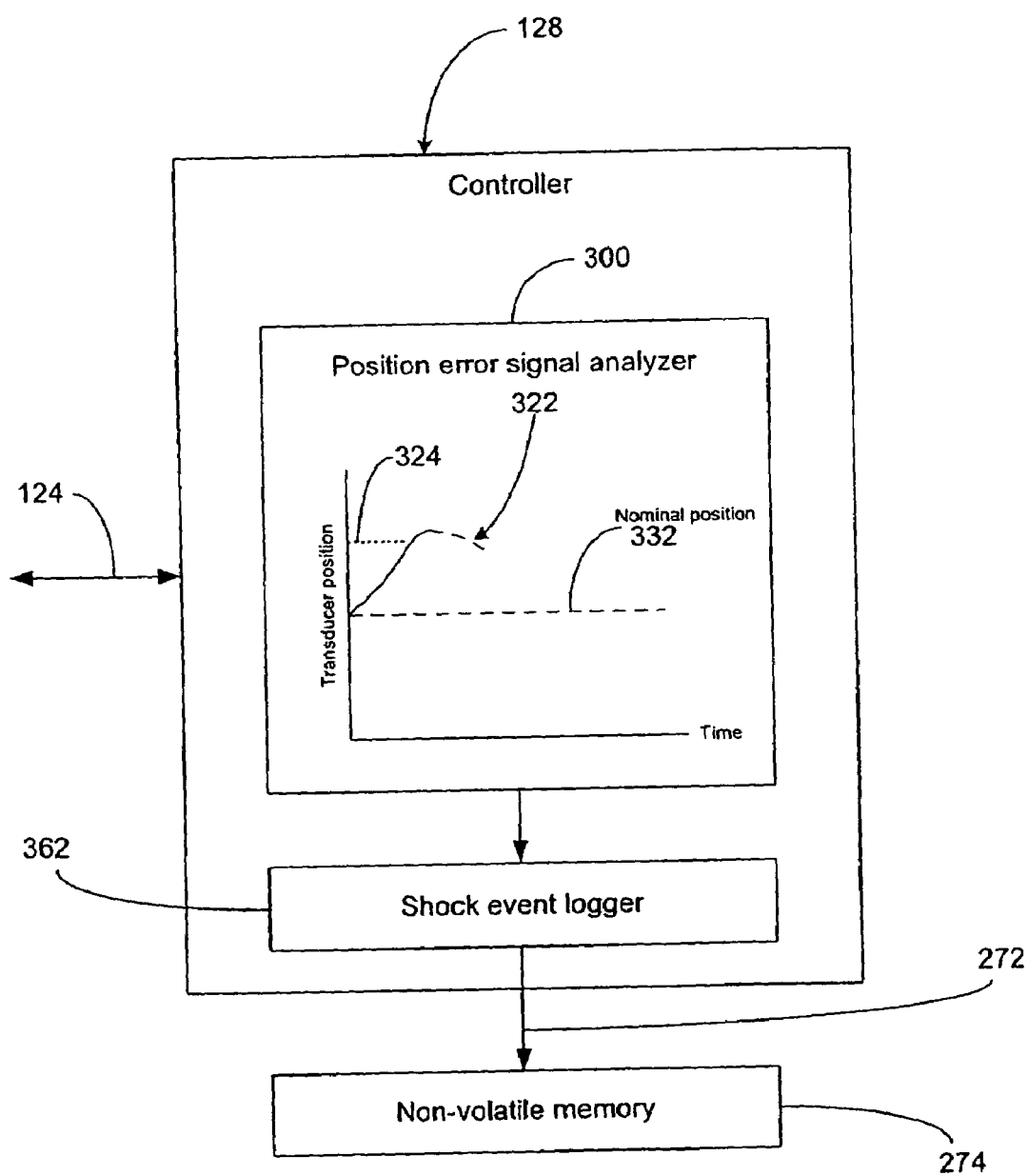
FIG. 3C illustrates a block diagram of one embodiment of the controller wherein the shock detection system comprises a position error signal (PES) processor that monitors magnitude of transducer position deviation.

FIG. 3C illustrates the shock detection system that comprises a position error signal (PES) processor 300. As is known in the art, position of the transducer relative to the servo tracks on the disk is monitored by signals generated by the servo wedges. Thus, monitoring of the position of the transducer relative to the servo tracks permits determination of unexpected movement of the transducer, such as that caused by a shock. An exemplary PES signal 322 indicative of a position deviation of the transducer is analyzed by the PES processor 300 to determine if the position deviation of the transducer is due to a shock.

As shown in FIG. 3C, the exemplary PES signal 322 exceeds a predetermined threshold value 324 when compared to an exemplary reference position curve 332 so as to define a shock event. In one embodiment, anytime a PES signal exceeds the predetermined threshold value 324, a shock event is defined.

In one embodiment, the PES processor 300 further processes the PES signal 322 in a manner described below so as to provide the shock event logger 362 with shock event information. The shock event logger 362 then records the selected information 272 to the non-volatile memory 274 in a manner described below.

Figure 3D:
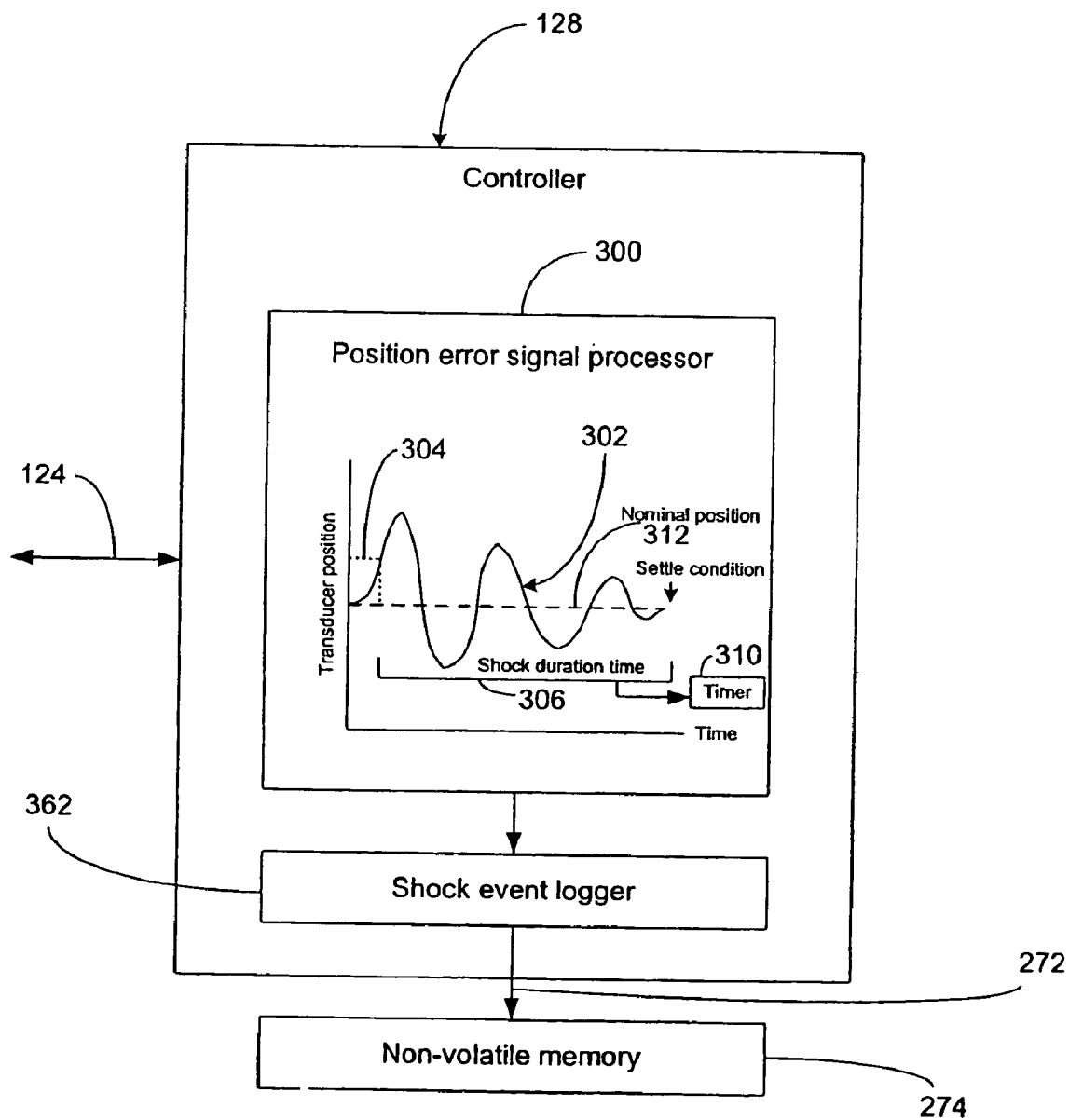
FIG. 3D illustrates a block diagram of one embodiment of the controller wherein the shock detection system comprises a PES processor that monitors transducer position deviation and duration of shock events.

FIG. 3D illustrates the shock detection system that comprises another implementation of the PES processor 300. An exemplary PES signal 302 indicative of a position deviation of the transducer is analyzed by the PES processor 300 to determine if the position deviation of the transducer is due to a shock.

As shown in FIG. 3D, the exemplary PES signal 302 exceeds a predetermined threshold value 304 when compared to an exemplary reference position curve 312 so as to define a shock event. In one embodiment, a timer 310 is triggered when the transducer PES signal 302 exceeds the predetermined threshold value 304, so as to start a shock duration 306. The shock duration 306 ends when a settle condition is satisfied. The shock duration 306 greater than a specified time interval is indicative of a shock event in one embodiment.

In one embodiment, the PES processor 300 further processes the PES signal 302 within the shock duration time 306 in a manner described below so as to provide the shock event logger 362 with shock event information. The shock event logger 362 then records the selected information 272 to the non-volatile memory 274 in a manner described below.

Figure 4:
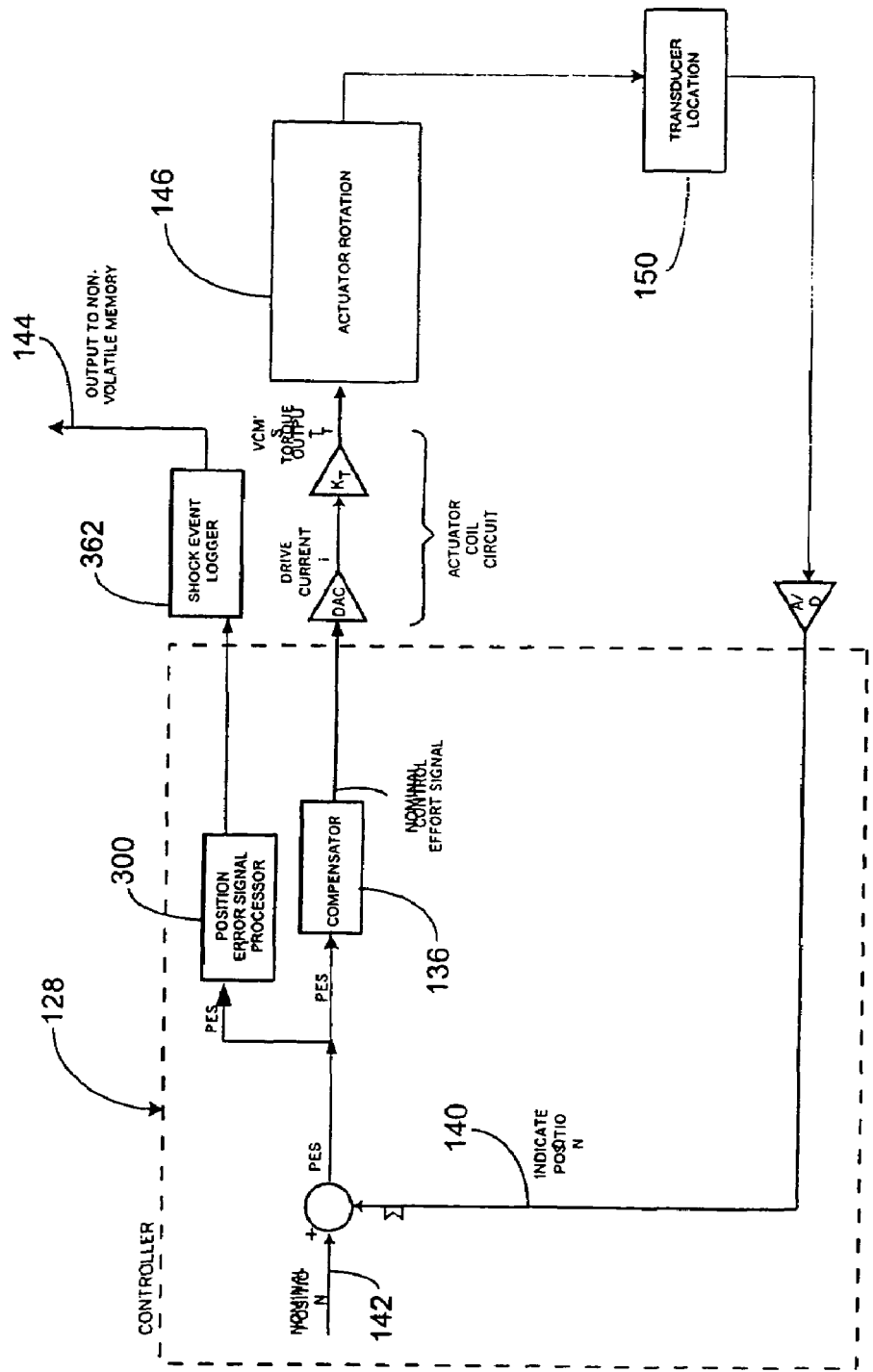
FIG. 4 is a functional block diagram of a servo control loop that corrects for the position deviation, and also analyzes the PES to determine if the position deviation is caused by a shock event, wherein the shock event information is logged by the shock event logger.

FIG. 4 illustrates an exemplary servo loop that monitors the position of the transducer so as to determine the PES. The controller 128 determines the PES from inputs of reference position 142 and indicated position 140 in a manner well known in the art. The PES is input into a compensator 136 that outputs a control signal that induces adjustment of the position deviated transducer. The control signal is supplied to the actuator coil circuit that causes actuator rotation 146 so as to move the transducer back towards the reference position. A resulting updated transducer location 150 is fed back to the controller 128 as an updated indicated position 140 to form a servo loop that is well known in the art.

In one embodiment, the controller 128 further comprises the PES processor 300 and the shock event logger 362. The PES processor 300 receives the PES as an input, and analyzes the PES to determine if the PES is a result of a shock event. If the PES is determined to be due to a shock event, the information about the shock event, including the PES and/or shock event duration, is recorded to the non-volatile memory as an output 144 of the shock event logger 362. Such a record of shock events permits disk drive service providers to diagnose disk drive problems in many situations.

Figure 5:
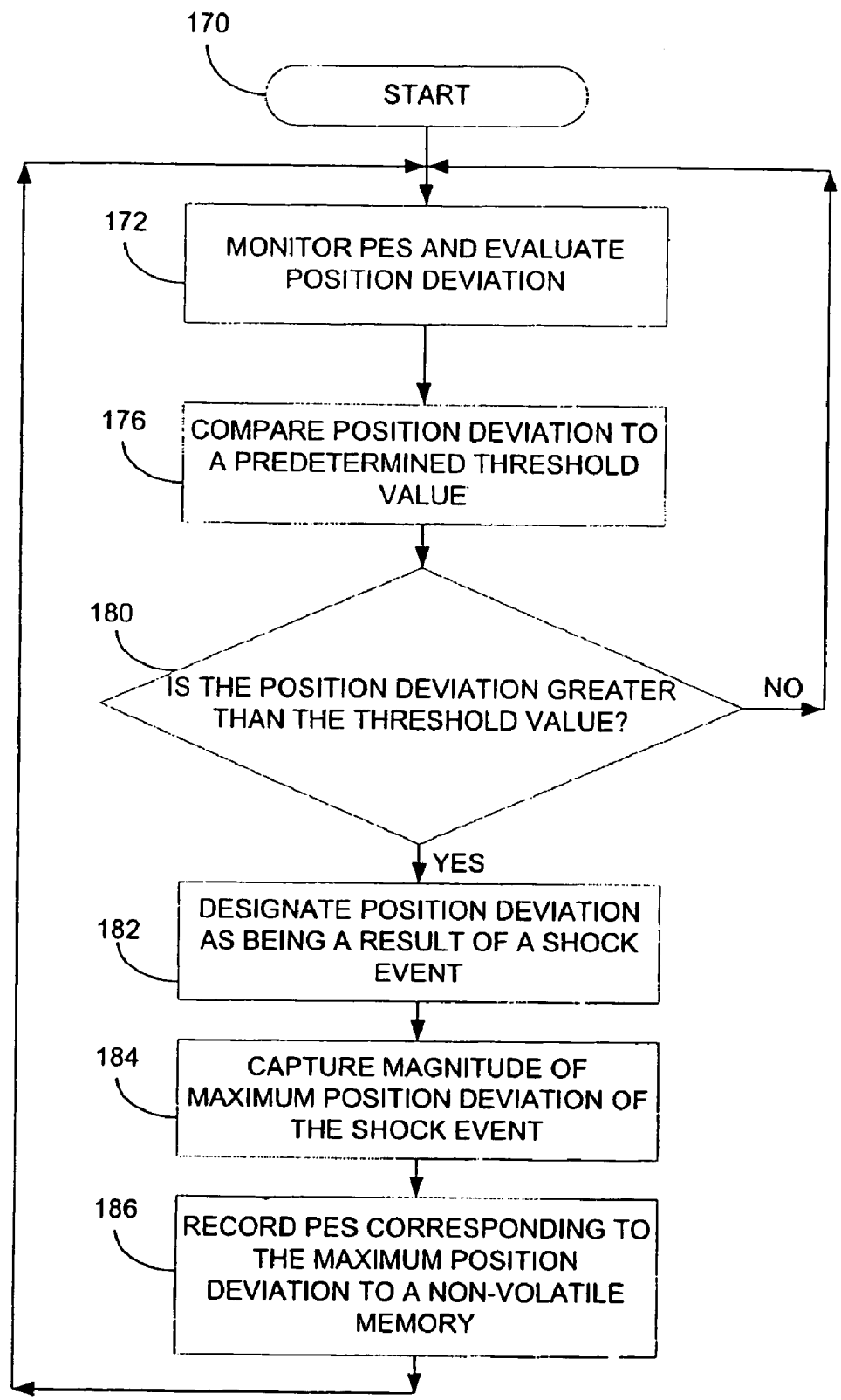
FIG. 5 illustrates a flow chart that represents one possible algorithm that can be used to determine if a shock event has occurred, wherein the position deviation is compared with a predetermined position deviation threshold level, and information about the shock event is logged.

FIG. 5 illustrates one possible algorithm used by the controller, and in particular the PES processor to determine if the PES, and thus the position deviation, is caused by a shock event. The disk drive begins operation as a start state 170 and enters a transducer position monitoring loop described below. In state 172, the PES processor monitors the PES and evaluates the position deviation. In state 176 that follows, the PES processor compares the position deviation to a predetermined threshold value, and decides in a decision state 180 if the position deviation is greater than the predetermined threshold value. If the answer is a 'NO', then the position deviation is determined to be caused by something other than a shock, and no further action is taken before looping back to begin another monitoring process. If the answer in the decision state 180 is a 'YES', then the position deviation is designated as being a result of a shock event in state 182. In state 184, a magnitude of maximum position deviation of the shock event is captured. In state 186 that follows, the shock event logger records the PES corresponding to the shock event to a non-volatile memory. The algorithm loops back to begin another monitoring process.

Although the predetermined threshold level, to which the position deviation is compared to in the state 180, can be set to any arbitrary value, setting such a value too low can lead to excessive recording of position deviations due to numerous spurious events. As is understood in the art, a write-unsafe (WUS) condition is typically triggered when the position deviation exceeds approximately 16% of the track width. In one embodiment described above in reference to FIG. 5, the predetermined threshold level is set at approximately 32% of the track width, twice the WUS level, in order to prevent recording of numerous spurious events.

Figure 6:
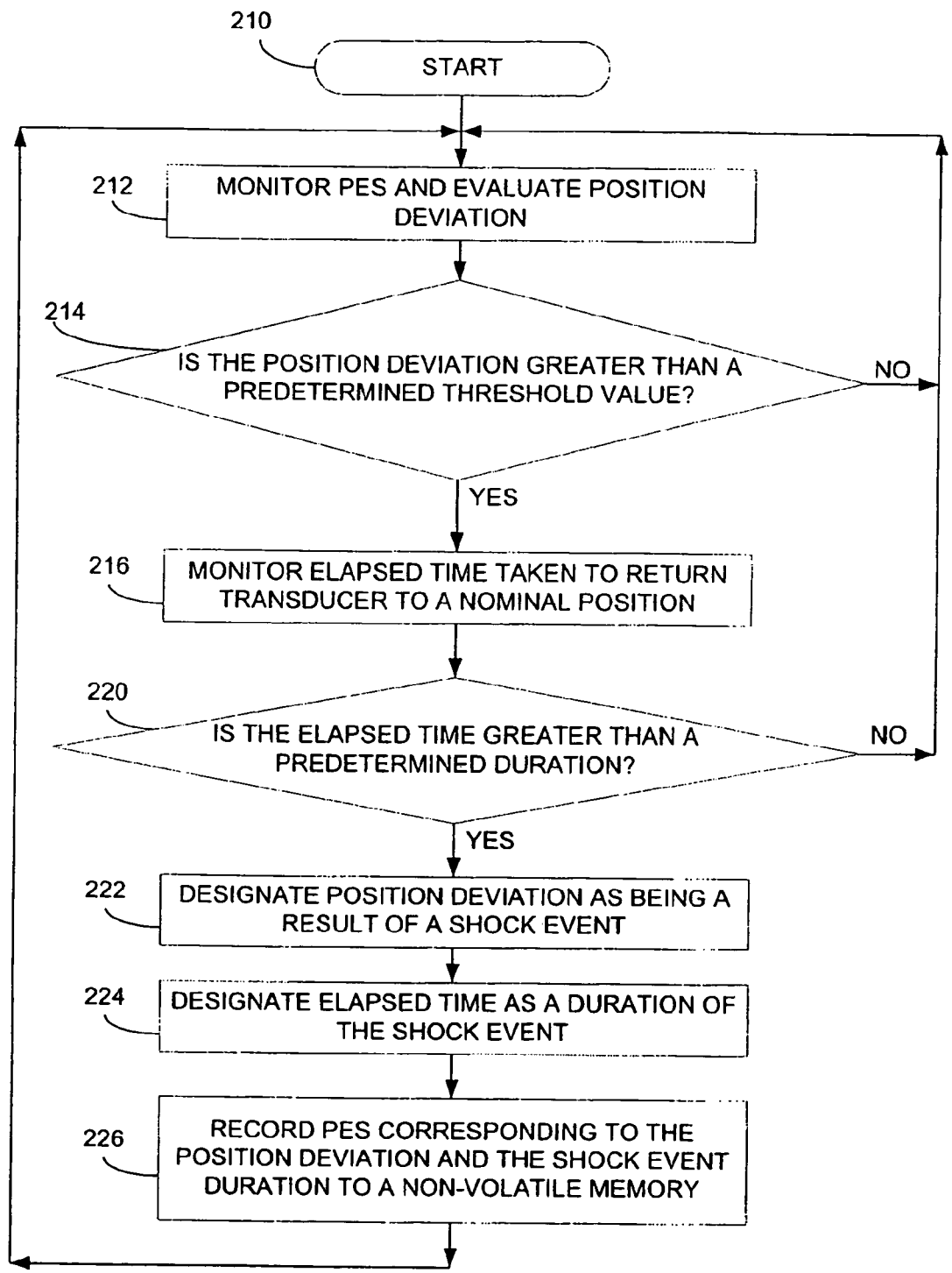
FIG. 6 illustrates a flow chart that represents another possible algorithm that can be used to determine and log a shock event, wherein both the position deviation and the duration of the shock event are recorded.

FIG. 6 illustrates another possible algorithm that is based on both position deviation and duration of the deviation to determine whether the position deviation is due to a shock event. The disk drive begins operation as a start state 210 and enters a transducer position monitoring loop described below. In state 212, the PES processor monitors the PES and evaluates a position deviation. In a decision state 214, a decision is made based on whether the position deviation is greater than a predetermined threshold value. If the answer is a 'NO', then the position deviation is determined to be caused by something other than a shock, and no further action is taken before looping back to begin another monitoring process. If the answer in the decision state 214 is a 'YES', then the PES processor monitors an elapsed time taken to return the transducer to a reference position in state 216.

In a decision state 220, a decision is made based on whether the elapsed time is greater than a predetermined duration. If the answer is a 'NO', then the event is not considered to be a shock event, and the algorithm loops back to begin another monitoring process. If the answer is a 'YES', then the event is considered to be a shock event. In state 222 that follows, the position deviation is designated as being a result of the shock event. The elapsed time is designated as a duration of the shock event in state 224. In state 226, the shock event logger records the PES corresponding to the position deviation and the shock event duration to a non-volatile memory. The algorithm loops back to begin another monitoring process.

Figure 7:
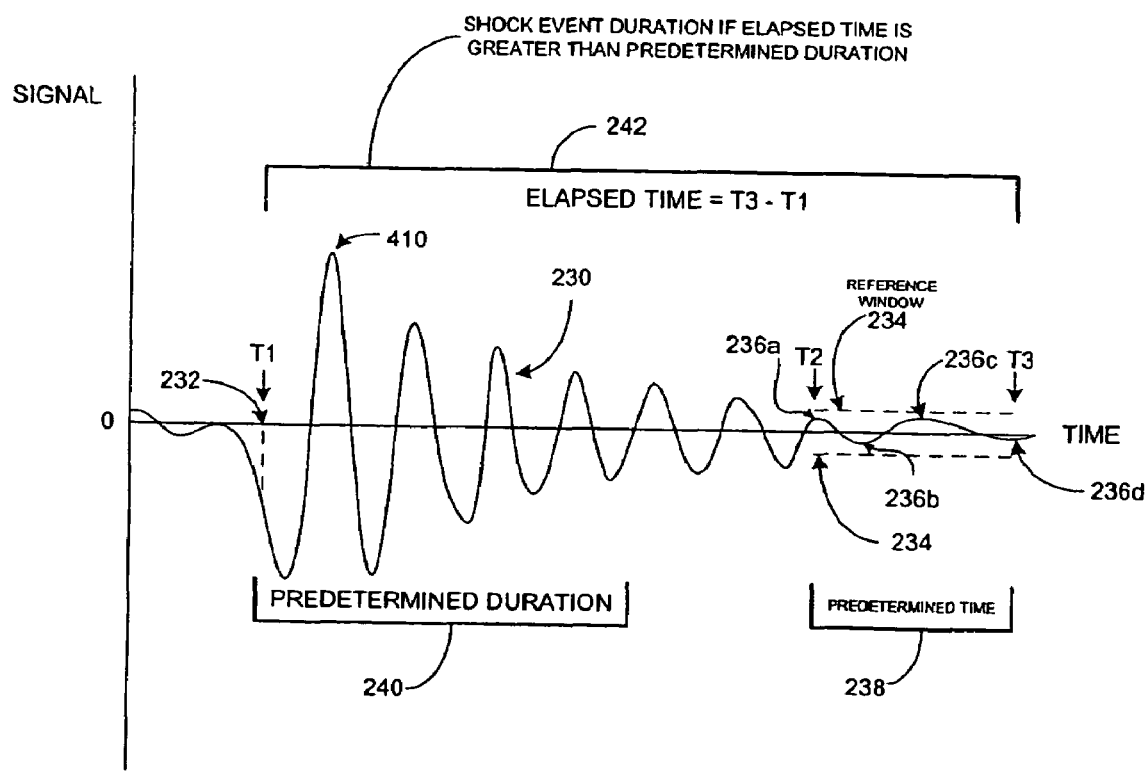
FIG. 7 illustrates an exemplary shock signal from which shock event information can be captured.

FIG. 7 illustrates an exemplary shock signal that can be detected by any one of the shock detection system implementations described above. It will be understood that a signal 230 can represent the shock sensor signal, back-emf signal, or the PES. FIG. 7 further illustrates exemplary methods of determining information about the shock event based on selected magnitude and/or duration of the signal 230.

The signal 230 causes an event-begin 232 at time T1. The event-begin 232 can be triggered by, for example, the signal 230 exceeding a threshold value. The signal 230 undergoes a series of oscillations, until the transducer is considered to be settled at time T3 so as to define a shock event duration 242 of T3–T1. In one embodiment, the transducer is considered to be settled when the successive position deviations are within a predetermined settling window 234 for at least a predetermined time 238. The predetermined time 238 is triggered at time T2 when a peak is within the predetermined settling window 234. Thus, peak 236*a* triggers T2, and successive peaks 236*b–d* are within the settling window 234 so as to satisfy the settle condition.

In one embodiment, the PES processor determines the maximum magnitude of the signal among plurality of peaks between T1 and T3, and designates that magnitude as the magnitude of the shock event. One method of capturing the maximum magnitude peak comprises progressively comparing the peaks' magnitudes between T1 and T3 and retaining the largest magnitude. In the exemplary signal 230, peak 410 has the largest magnitude, thus its magnitude is designated as the magnitude of the shock event.

In one embodiment, the event being monitored is considered to be a shock event if the elapsed time 242 is greater than a predetermined duration 240. Thus, in FIG. 7, the elapsed time 242 does exceed the predetermined duration 240, and the event is considered to be a shock event. The elapsed time 242 is then designated as a duration of the shock event, and is recorded by the shock event logger in a manner described below.

In one embodiment, the predetermined time 238 that defines the settling condition is set at approximately the time taken for the transducer to cross approximately 7 servo wedges. As is understood in the art, a wedge-to-wedge time interval is a common unit of time that is substantially constant, since the servo wedges are spaced circumferentially in a substantially periodic manner, and the disk spins at a substantially fixed rate. For a disk that has 128 servo wedges per servo track, and spins at approximately 7200 rpm, one wedge-to-wedge time interval represents approximately 65 $\mu$s.

In one embodiment, the predetermined duration 240 is set at approximately 100 wedge-to-wedge time intervals. Alternatively, the predetermined duration 240 can be set at approximately 300 or 500 wedge-to-wedge time intervals, or any number of time intervals.

Figure 8:
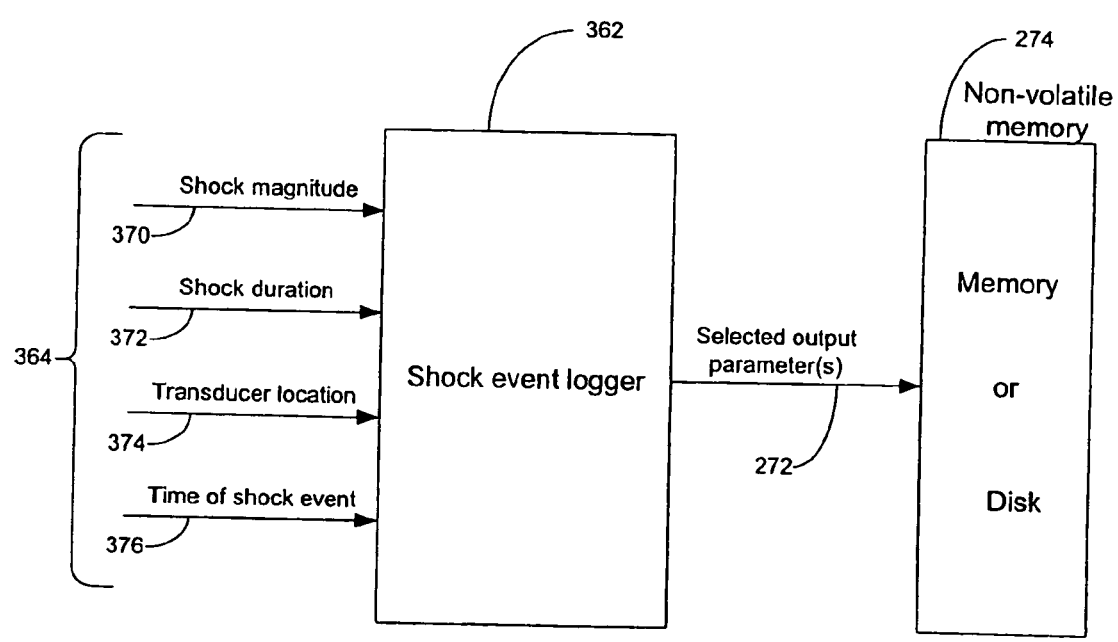
FIG. 8 is an exemplary block diagram that illustrates one possible method of logging information about the shock event determined by the shock detection system.

FIG. 8 is a functional block diagram that illustrates one possible embodiment of the shock event logger 362 that receives shock event information from the shock detection system (not shown) and records selected information to the non-volatile memory 274. A plurality of input parameters 364 received from the shock detection system may include, but is not limited to, a shock magnitude 370, a shock duration 372, a transducer location 374, and time of the shock event 376.

The shock magnitude 370 may be the magnitude of the shock sensor signal, back-emf signal, transducer velocity signal, or the PES signal described above. The shock duration 372 may be the duration of the shock event described above in reference to FIG. 7. The transducer location 374 or locations during the shock event may be recorded as well to aid in diagnosis of a damaged disk drive at a later time. Similarly, the time of shock event 376 may also aid in the diagnosis. It will be appreciated that any number of other parameters can be passed onto the shock event logger 362.

The shock event logger 362 receives the input parameters 364 about the shock event and selects the parameters to be recorded. In one embodiment, this selection is done during the manufacturing process. In another embodiment, the selection is done by a user when setting up the disk drive initially. It will be appreciated that the selection of shock event parameters to be recorded can be implemented in any number of ways without departing from the spirit of the invention.

The selected output parameter(s) 272 is recorded on the non-volatile memory 274. In one embodiment, the non-volatile memory 274 is a semiconductor memory within the hard disk drive. In another embodiment, the non-volatile memory 274 is a portion of the disk. It will be appreciated that the non-volatile memory 274 may be in any number of form, such that the shock event information can be retrieved at a later time, without departing from the spirit of the invention.

The shock event logger 362 can further be programmed to select the format in which the selected output parameters are recorded. FIGS. 9A–9D illustrate possible exemplary graphic representation of formats of recorded shock event information. The position deviation magnitude and the shock event duration are two parameters used to illustrate the exemplary formats. It will be appreciated, however, that other shock event parameters described above can be recorded in a similar manner without departing from the spirit of the invention.

Figure 9A:
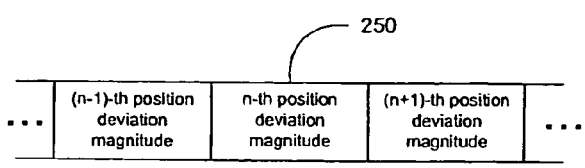
FIG. 9A illustrates one possible implementation of recording magnitudes of position deviations that are caused by shock events, wherein the recorded data is stored sequentially.

FIG. 9A illustrates one possible method of recording the shock event information for the implementation described above in reference to FIG. 5, wherein the magnitude of the position deviation determines whether the position deviation is due to a shock event. A plurality of shock event position deviation magnitudes 250 are recorded on the non-volatile memory in a sequential manner such that the information can be retrieved later for analysis.

Figure 9B:
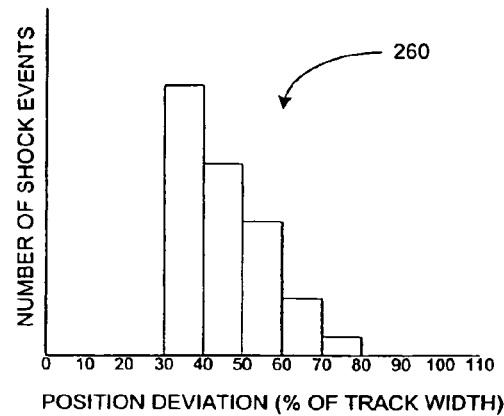
FIG. 9B illustrates an alternate implementation of FIG. 9A, wherein the position deviations are recorded in the form of a histogram.

FIG. 9B illustrates an alternate method of recording the shock event information. An exemplary 1-dimensional histogram 260 bins the position deviations into 10% of track width bins, and accumulates a plurality of shock event position deviation values in the respective bins. Thus in the exemplary histogram 260, position deviation between 30% and 40% of the track width occurred more frequently than any other bins.

Figure 9C:
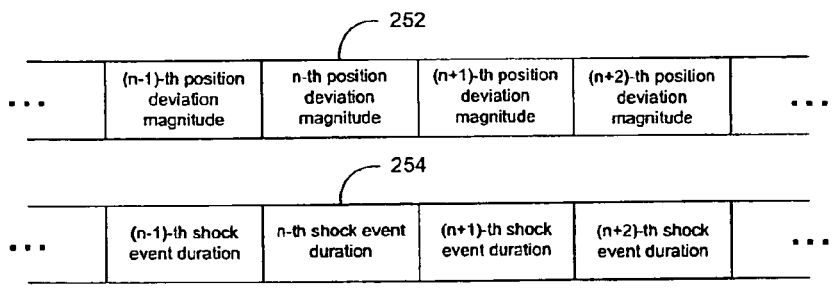
FIG. 9C illustrates one possible implementation of recording magnitudes of position deviations that are caused by shock events and shock event durations, wherein the recorded data is stored sequentially.

FIG. 9C illustrates one possible method of recording the shock event information for the implementation described above in reference to FIG. 6, wherein the position deviation and the shock event duration are recorded. A plurality of shock event position deviation magnitudes 252 and their corresponding shock event durations 254 are recorded on the non-volatile memory in a sequential manner such that the information can be retrieved later for analysis.

Figure 9D:
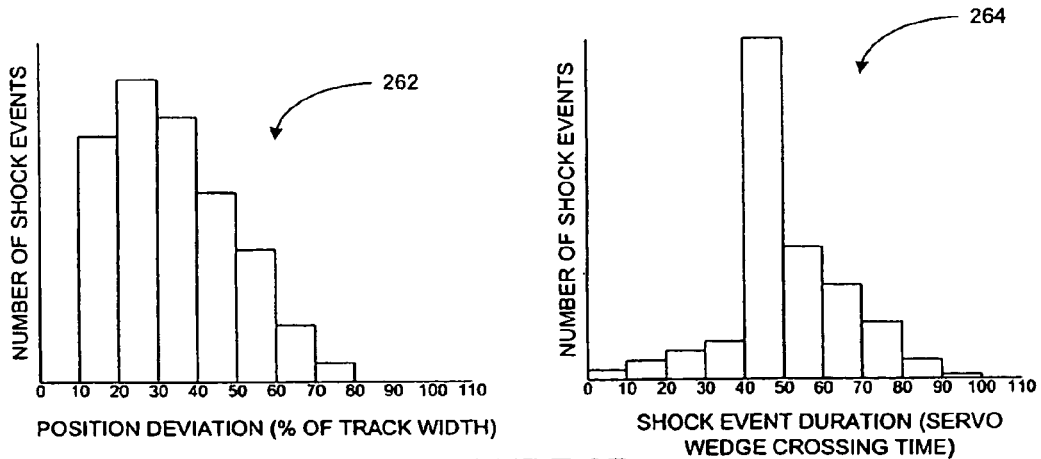
FIG. 9D illustrates an alternate implementation of FIG. 9C, wherein the position deviations and the shock event durations are recorded in the form of histograms.

FIG. 9D illustrates an alternate method of recording to that described above in reference to FIG. 9C. Two exemplary 1-dimensional histograms 262 and 264 represent plurality of shock event position deviation magnitudes and shock event durations. In the exemplary histogram 262, the position deviations are divided into 10% of the track widths bin sizes. In the exemplary histogram 264, the shock event durations are divided into 10 servo wedge crossing bin sizes.

Figure 9E:
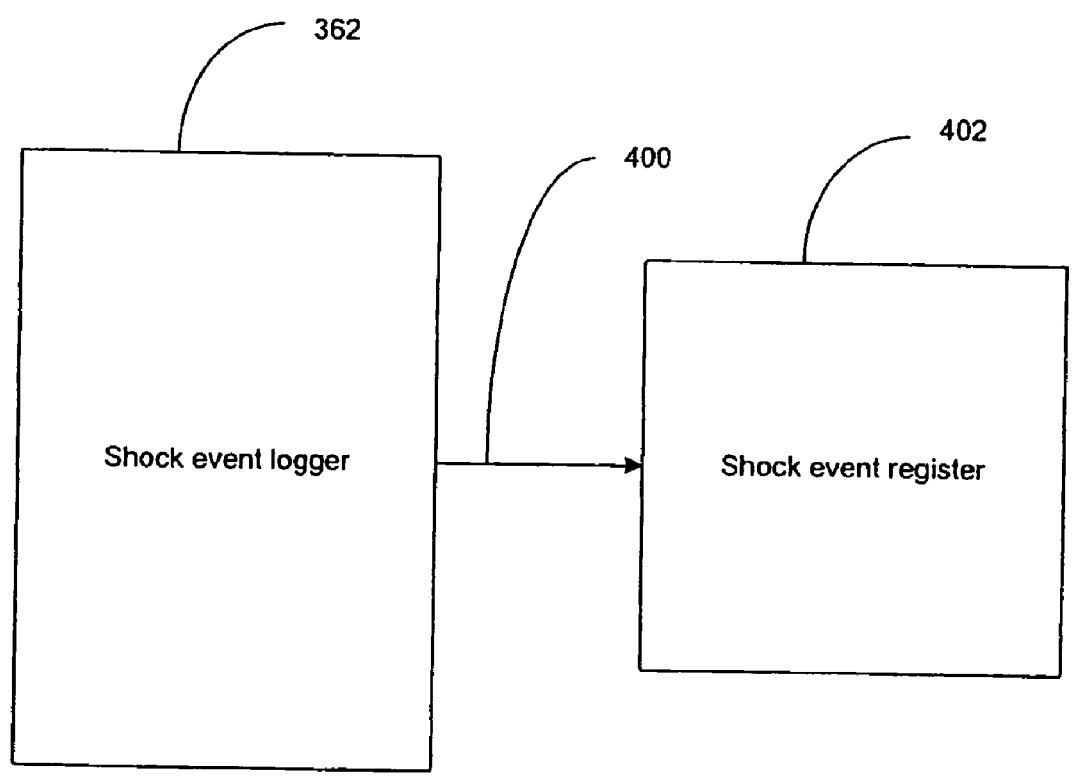
FIG. 9E illustrate one possible implementation of recording the number of shock events by using an incremental register.

FIG. 9E illustrates one possible method of recording the shock event information. The shock event logger 362 receives information about the shock from the shock detection system (not shown) such as those described above. The shock event logger 362 then outputs a signal 400 that increments a count in a shock event register 402. In one embodiment, the shock event register 402 is incremented every time a shock event is detected and the signal 400 is output by the shock event logger 362. Thus, the shock event register keeps track of the total number of shocks received by the hard disk drive.

It will be appreciated that the inventive features described above may be implemented in hard disk drives in a manner that is relatively easy and cost effective. In particular, the methods of determining shock events without the use of an independent shock sensor, as described above, can be implemented by programming of a firmware that is part of the disk drive controller. Thus in one embodiment, the PES processor 300 of FIGS. 3C, D and 4 is a functional block within the firmware that performs tasks in manners described above.

It will also be appreciated that by logging shock events in manners described above, the disk drive may be diagnosed and serviced in an improved manner. An analysis of the logged shock event information may tell the service provider how much shock the disk drive was subjected to, so as to further test and service the disk drive accordingly. In one embodiment, the shock event logger is also a functional block within the firmware.

What is claimed is:

1. A hard disk drive comprising:
   a rotatable disk having a magnetic recording media wherein the rotatable disk defines a plurality of concentric servo tracks;
   a pivotable actuator that is movable with respect to the rotatable disk;
   a transducer disposed on the actuator so as to be positioned with respect to selected ones of the plurality of concentric servo tracks;
   a controller that controls the movement and position of the transducer with respect to the selected servo tracks;
   a shock detection system that analyzes a signal indicative of a movement of at least a portion of the hard disk drive, determines whether the hard disk drive has experienced a shock event, and provides a shock event parameter based on the signal; and
   a shock event logger that records the shock event parameter by incrementing one of a plurality of bins based on the value of the shock event parameter provided by the shock detection system.

2. The hard disk drive of claim 1, wherein the shock event logger records the shock event parameter to a memory.

3. The hard disk drive of claim 2, wherein the memory is a non-volatile memory.

4. The hard disk drive of claim 3, wherein the non-volatile memory is a semiconductor memory.

5. The hard disk drive of claim 3, wherein the non-volatile memory is a portion of the rotatable disk.

6. The hard disk drive of claim 1, wherein the shock detection system comprises a shock sensor signal processor that analyzes a signal from a shock sensor.

7. The hard disk drive of claim 6, wherein the shock sensor is an accelerometer that measures linear acceleration.

8. The hard disk drive of claim 6, wherein the shock sensor is an accelerometer that measures rotational acceleration.

9. The hard disk drive of claim 6, wherein the shock sensor comprises accelerometers that measure both linear and rotational accelerations.

10. The hard disk drive of claim 1, wherein the shock detection system comprises a back-emf signal processor that analyzes a back-emf signal generated when the actuator moves.

11. The hard disk drive of claim 1, wherein the shock detection system comprises a position error signal processor that analyzes the position error signal indicative of a position deviation of the transducer from a reference position.

12. The hard disk drive of claim 11, wherein the position error signal processor determines that a shock event has occurred when the position error signal exceeds a predetermined threshold value.

13. The hard disk drive of claim 12, wherein the shock event logger records the position error signal to the non-volatile memory.

14. The hard disk drive of claim 1, wherein the shock event parameter is a position deviation of the transducer.

15. The hard disk drive of claim 1, wherein the shock event parameter is a duration of the shock event.

16. The hard disk drive of claim 1, wherein the shock event parameter is a time of the shock event.

17. A hard disk drive comprising:
   a rotatable disk having a magnetic recording media wherein the rotatable disk defines a plurality of concentric servo tracks;
   a pivotable actuator that is movable with respect to the rotatable disk;
   a transducer disposed on the actuator so as to be positioned with respect to selected ones of the plurality of concentric servo tracks;
   a controller that controls the movement and position of the transducer with respect to the selected servo tracks;
   a shock detection system that analyzes a signal indicative of a movement of at least a portion of the hard disk drive and determines whether the hard disk drive has experienced a shock event;

a shock event logger that records information about the shock event as determined by the shock detection system;

wherein the shock detection system comprises a position error signal processor that analyzes the position error signal indicative of a position deviation of the transducer from a reference position and determines that a shock event has occurred when the position error signal exceeds a predetermined threshold value of approximately 32% of a track width; and wherein the shock event logger records the position error signal by incrementing one of a plurality of bins based on the value of the position error signal.

18. A hard disk drive comprising:

a rotatable disk having a magnetic recording media wherein the rotatable disk defines a plurality of concentric servo tracks;

a pivotable actuator that is movable with respect to the rotatable disk;

a transducer disposed on the actuator so as to be positioned with respect to selected ones of the plurality of concentric servo tracks;

a controller that controls the movement and position of the transducer with respect to the selected servo tracks;

a shock detection system that analyzes a signal indicative of a movement of at least a portion of the hard disk drive and determines whether the hard disk drive has experienced a shock event;

a shock event logger that records information about the shock event as determined by the shock detection system;

wherein the shock detection system comprises a position error signal processor that analyzes the position error signal indicative of a position deviation of the transducer from a reference position and determines that a shock event has occurred when the position error signal exceeds a predetermined threshold value; and wherein the shock event logger records position error signals corresponding to a plurality of shock events by incrementing one of a plurality of bins based on the value of the position error signal, the position error signal being recorded in a non-volatile memory.

19. A hard disk drive comprising:

a rotatable disk having a magnetic recording media wherein the rotatable disk defines a plurality of concentric servo tracks;

a pivotable actuator that is movable with respect to the rotatable disk;

a transducer disposed on the actuator so as to be positioned with respect to selected ones of the plurality of concentric servo tracks;

a controller that controls the movement and position of the transducer with respect to the selected servo tracks;

a shock detection system that analyzes a signal indicative of a movement of at least a portion of the hard disk drive and determines whether the hard disk drive has experienced a shock event;

a shock event logger that records information about the shock event as determined by the shock detection system; and wherein the shock detection system comprises a position error signal processor that monitors an elapsed time taken for the position deviated transducer to return to and maintain a position within a reference window for a predetermined time, wherein the position error signal processor determines that a shock event occurred when the elapsed time exceeds a predetermined duration.

20. The hard disk drive of claim 19, wherein the predetermined duration is the time taken for a predetermined number of wedge-to-wedge time intervals encountered by the transducer, wherein the wedge-to-wedge time interval represents a unit of time that depends on the rotational speed of the disk and the number of servo wedges per servo track.

21. The hard disk drive of claim 20, wherein the predetermined duration is 100 wedge-to-wedge time intervals.

22. The hard disk drive of claim 20, wherein the predetermined duration is 300 wedge-to-wedge time intervals.

23. The hard disk drive of claim 20, wherein the predetermined duration is 500 wedge-to-wedge time intervals.

24. The hard disk drive of claim 19, wherein the shock event logger records the elapsed time to the non-volatile memory.

25. The hard disk drive of claim 24, wherein the shock event logger records elapsed times corresponding to a plurality of shock events in a sequential manner.

26. The hard disk drive of claim 24, wherein the shock event logger records the number of shock events in an incremental register.

27. The hard disk drive of claim 24, wherein the shock event logger records a histogram of the elapsed time, wherein the histogram represents a plurality of shock events.

28. A method of logging shock events in a hard disk drive comprising a rotatable disk having a magnetic recording media, the method comprising:

providing a shock event logger housed within the hard disk drive;

monitoring a signal from a component of the hard disk drive that responds to at least one of displacement, velocity, or acceleration of at least a portion of the hard disk drive;

evaluating the signal to determine whether the at least one of displacement, velocity, or acceleration is a result of a shock event;

providing a shock event parameter based on the signal to the shock event logger; and incrementing one of a plurality of bins based on the value of the shock event parameter.

29. The method of claim 28, wherein incrementing comprises incrementing one of a plurality of bins in a non-volatile memory.

30. The method of claim 29, wherein logging to the non-volatile memory comprises logging to a semiconductor memory.

31. The method of claim 29, wherein logging to the non-volatile memory comprises logging to a portion the rotatable disk.

32. The method of claim 28, wherein the shock event parameter is a position deviation of a transducer of the hard disk drive.

33. The method of claim 28, wherein the shock event parameter is a duration of the shock event.

34. The method of claim 28, wherein the shock event parameter is a time of the shock event.

* * * * *